(12) United States Patent
Vion-Dury

(10) Patent No.: US 7,739,587 B2
(45) Date of Patent: Jun. 15, 2010

(54) METHODS AND APPARATUSES FOR FINDING RECTANGLES AND APPLICATION TO SEGMENTATION OF GRID-SHAPED TABLES

(75) Inventor: Jean-Yves Vion-Dury, Saint-Ismier (FR)

(73) Assignee: Xerox Corporation, Norwalk, CT (US)

( * ) Notice: Subject to any disclaimer, the term of this patent is extended or adjusted under 35 U.S.C. 154(b) by 1006 days.

(21) Appl. No.: 11/451,525

(22) Filed: Jun. 12, 2006

(65) Prior Publication Data
US 2007/0288539 A1 Dec. 13, 2007

(51) Int. Cl.
*G06F 17/16* (2006.01)
(52) U.S. Cl. .................. 715/217; 715/220; 715/227; 715/228; 715/235
(58) Field of Classification Search ............. 708/200; 715/234, 220, 217
See application file for complete search history.

(56) References Cited

U.S. PATENT DOCUMENTS

| | | | | |
|---|---|---|---|---|
| 5,577,249 | A * | 11/1996 | Califano | 707/100 |
| 6,006,240 | A | 12/1999 | Handley | |
| 6,801,673 | B2 * | 10/2004 | Chao et al. | 382/282 |
| 7,472,114 | B1 * | 12/2008 | Rowney et al. | 707/3 |
| 2004/0006742 | A1 * | 1/2004 | Slocombe | 715/513 |
| 2006/0265649 | A1 * | 11/2006 | Danilo | 715/542 |

OTHER PUBLICATIONS

Rigamonit, M Bloechle, JL, Hadjar,K, Lalanne, D, Ingold R; "Towards a Canonical and Structured Representation of PDF Documents through Reverse Engineering" Document Analysis and Recoginition 2005 Proceeding Eight Internation Conference; Publication Date Aug. 29-Sep. 1, 2005.*

"Hash Table," Wikipedia, pp. 1-10, at http://en.wikipedia.org/wiki/Hash_table, last visited on Feb. 15, 2006.

Garcia et al., "Using a Generic Document Recognition Method for Mathematical Formulae Recognition," in *Selected Papers From the Fourth International Workshop on Graphics Recognition Algorithms and Applications* pp. 236-244, 2002.

Rigamonti et al., "Towards a Canonical and Structured Representation of PDF Documents Through Reverse Engineering," In proc. of $8^{th}$ International conference on Document Analysis and Recognition, Seoul (Korea), pp. 1050-1054, 2005.

Avis et al., "An Efficient Algorithm for Decomposing a Polygon into Star-Shaped Polygons," *Pattern Recognition*, vol. 13, No. 6, pp. 395-398, 1981.

U.S. Appl. No. 11/312,267, filed Dec. 20, 2005, Vion-Dury.

* cited by examiner

*Primary Examiner*—Joshua D Campbell
*Assistant Examiner*—Christopher Bryant
(74) *Attorney, Agent, or Firm*—Fay Sharpe LLP

(57) ABSTRACT

In a method for identifying cells, line graphics are converted into vectors (12) having a canonical form without vector overlaps or crossings. Connecting vectors (22, 24, 26, 30, 32) are associated, including (i) forking vectors (22) having common starting points, and (ii) meeting vectors (24) having common ending points. A set of vectors is identified including at least two forking vectors and two meeting vectors cooperatively defining a cell.

18 Claims, 8 Drawing Sheets

| | Initial $s_i = \langle p_1, p_2, c, w \rangle$ $s_j = \langle p_3, p_4, c, w \rangle$ | Canonical | Initial Points Ordering | Adjustment(s) |
|---|---|---|---|---|
| Overlapping (and $s_i < s_j$) | | | $p_1 < p_3 < p_2 < p_4$ | $s_i = \{p_1, p_3, c, w\}$ ($p_2$ is replaced by $p_3$) |
| | | | $p_1 \sim p_3 < p_2 < p_4$ | $s_j = \{p_2, p_4, c, w\}$ |
| | | | $p_1 < p_3 < p_4 < p_2$ | $s_i = \{p_1, p_3, c, w\}$ ($p_2$ is replaced by $p_3$) and insert a new $s_{k+1} = \{p_4, p_2, c, w\}$ |
| Containing (and $s_i < s_j$) | | | $p_1 \sim p_3 < p_4 < p_2$ | $s_i = \{p_1, p_4, c, w\}$, $s_j = \{p_4, p_2, c, w\}$ |
| | | | $p_1 < p_3 < p_4 \sim p_2$ | $s_i = \{p_1, p_3, c, w\}$ ($p_2$ is replaced by $p_3$) |

FIG. 2

| Initial<br>$s_i = \langle p_1, p_2, c, w \rangle$<br>$s_j = \langle p_3, p_4, c', w' \rangle$<br>$p$ = intersect point | Canonical | Adjustment(s) |
|---|---|---|
| | | $p$ being the intersection point,<br>$s_i = \{p_1, p, c, w\}$ insert a new $s_{k+1} = \{p, p_2, c, w\}$<br>$s_j = \{p_3, p, c', w'\}$ insert a new $s_{k+2} = \{p, p_4, c', w'\}$ |
| | | $s_i = \{p_1, p_4, c, w\}$ insert a new $s_{k+1} = \{p_4, p_2, c, w\}$ |
| | | $s_i = \{p_1, p_3, c, w\}$ insert a new $s_{k+1} = \{p_3, p_2, c, w\}$ |
| | | $s_i = \{p_1, p_3, c, w\}$ insert a new $s_{k+1} = \{p_3, p_2, c, w\}$ |
| | | $s_j = \{p_3, p_2, c', w'\}$ insert a new $s_k = \{p_2, p_4, c', w'\}$ |

Crossing (and $s_i < s_j$)

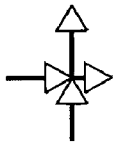

FIG. 3

Forks(s) = [$s_1, s_2$]

Meets(s) = [$s_1, s_2$]

Joins(s) = [$s_1$, $s_2$]

HC(s) = [s, $s_1$, $s_2$]
HCS($s_2$) = [$s_2$, $s_1$, s]

VC(s) = [s, $s_1$, $s_2$]
VCS($s_2$) = [$s_2$, $s_1$, s]

i1 = i0+1
i2 = i1+1
i3 = i2+m
(m>1)

i1 = i0+1
i2 = i1+1
i3 = i2+m
(m>1)

i1 = i0+1
i2 = i1+m
i3 = i2+1
i4 = i3+n
i5 = i4+1
(m>1, n>1)

| NMC | Minimal | Minimal | Minimal | Minimal | Minimal |
|---|---|---|---|---|---|
| Minimal | Minimal | Minimal | Minimal | Minimal | Minimal |
| Minimal | Minimal | Minimal | Minimal | Minimal | Minimal |
| Minimal | Minimal | Minimal | Minimal | | Minimal |
| Minimal | Minimal | Minimal | Minimal | Minimal | Minimal |
| Minimal | Minimal | Minimal | Minimal | Minimal | Minimal |
| Minimal | Minimal | Minimal | Minimal | Minimal | Minimal |

METHODS AND APPARATUSES FOR FINDING RECTANGLES AND APPLICATION TO SEGMENTATION OF GRID-SHAPED TABLES

BACKGROUND

The following relates to the document processing arts. It is described with example reference to applications involving the detection and delineation of cells in tables having separating gridlines. However, the following is applicable more generally applicable to detection and segmentation of gridlines and rectangles generally, and to apparatuses, methods, applications, and so forth employing same.

Document analysis relates to processing of documents to extract useful information. Table or tabular processing is an important area of document analysis. Tables or tabular presentations may contain valuable information such as quantitative results, synthesis, correlation, or other presentation of factual information, or so forth. Automated analysis of tabular information is difficult, however, because the information is typically grouped into table cells whose recognition depends upon spatial location in the document, relative alignment of cells with other cells, and similar layout-based considerations. In contrast, document analysis techniques tend to focus upon textual analysis that is typically relatively independent of document layout.

In some tables or tabulations, the cells are delineated by horizontal and vertical gridlines. These gridlines beneficially guide the eye of the human viewer to identify individual cells and, in some arrangements, selected groups of cells. Some automated table analysis techniques employ image analysis of such gridlines to assist in identifying table cells. For example, a gridline identified by image analysis may be taken as an indication of a boundary between table cells.

The robustness and reliability of such image analysis-based cell identification techniques has been limited by uncertainties in the image analysis, such as in thresholding typically used to distinguish gridline pixels from surrounding pixels. Moreover, deviations of the table grid from an ideal Cartesian grid-type layout can be problematic. For example, in some cases a group of cells may be merged across two or more rows, two or more columns, or so forth so that the merged cell does not "line up" with the general layout of rows and columns of the table grid. Similar problems can arise if a cell is split into two or more rows, two or more columns, or so forth.

Moreover, the above image analysis-based approaches are typically not directly applicable to documents whose graphical content is stored in an abstract format such as portable document format (PDF) or scalable vector graphics (SVG) format. In such abstract vector-based representations, there are typically many different (that is, redundant) ways for a given table grid to be represented. For example, each minimal cell (that is, each cell that does not contain any sub-cells) may be represented by four boundary vectors, with vector redundancy at each table cell boundary. Alternatively, horizontal vectors extending across all columns of the table may represent gridlines separating table rows, and similarly vertical vectors extending across all rows of the table may represent the gridlines separating table columns. This representation has no vector redundancy, but also does not have one-to-one correlation between grid vectors and individual minimal table cells. There are many other possible grid representations with various levels of vector redundancy.

One approach for processing documents stored in an abstract graphical representation such as SVG or PDF is to convert the abstract graphical content into a bitmapped representation, and then to process the bitmap using the aforementioned image analysis techniques to identify gridlines and table cells. However, this approach is computationally inefficient due to the intermediate bitmapping process, and also introduces the aforementioned difficulties of image analysis-based techniques.

CROSS REFERENCE TO RELATED PATENTS AND APPLICATIONS

The following related U.S. patent applications that commonly owned with the present application are each incorporated herein by reference:

Vion-Dury, U.S. application Ser. No. 11/312,267 filed Dec. 20, 2005, entitled "Normalization of Vector-Based Graphical Representations" is incorporated herein by reference in its entirety.

Handley, U.S. Pat. No. 6,006,240 issued Dec. 21, 1999, entitled "Cell Identification in Table Analysis" is incorporated herein by reference in its entirety.

BRIEF DESCRIPTION

According to certain aspects illustrated herein, there is provided a method for identifying cells. Line graphics are converted into vectors having a canonical form without vector overlaps or crossings. Connecting vectors are associated, including (i) forking vectors having common starting points, and (ii) meeting vectors having common ending points. A set of vectors is identified including at least two forking vectors and two meeting vectors cooperatively defining a cell.

According to certain aspects illustrated herein, there is provided a storage medium storing instructions executable to perform a method for identifying cells delineated by horizontal and vertical gridlines. The method includes: converting the gridlines into a set of non-redundant horizontal and vertical vectors without vector overlaps or crossings; and identifying a set of connecting vectors from the set of non-redundant horizontal and vertical vectors defining a rectangle. The identified set of connecting vectors includes at least: (i) a horizontal forking vector and a vertical forking vector having a common starting point defining a first corner of the rectangle; and (ii) a horizontal meeting vector and a vertical meeting vector having a common ending point defining an opposite second corner of the rectangle.

According to certain aspects illustrated herein, there is provided an apparatus for identifying table cells. A canonical transform processor is configured to convert gridlines into a set of non-redundant, non-overlapping, and non-crossing vectors. A datastructures builder is configured to construct datastructures associating vectors of the set of vectors with other vectors of the set of vectors having common starting points or common ending points. A cells segmenter is configured to reference the constructed datastructures to identify sub-sets of the set of vectors defining rectangles delineating cells of the table. Each sub-set of vectors includes at least (i) two vectors having common starting points and (ii) two vectors having common ending points.

BRIEF DESCRIPTION OF THE DRAWINGS

FIG. 2 diagrammatically shows suitable adjustments performed by the vectors converter of FIG. 1 for removing line segment overlaps.

FIG. 3 diagrammatically shows suitable adjustments performed by the vectors converter of FIG. 1 for removing line segment crossings.

DETAILED DESCRIPTION

Figure 1:
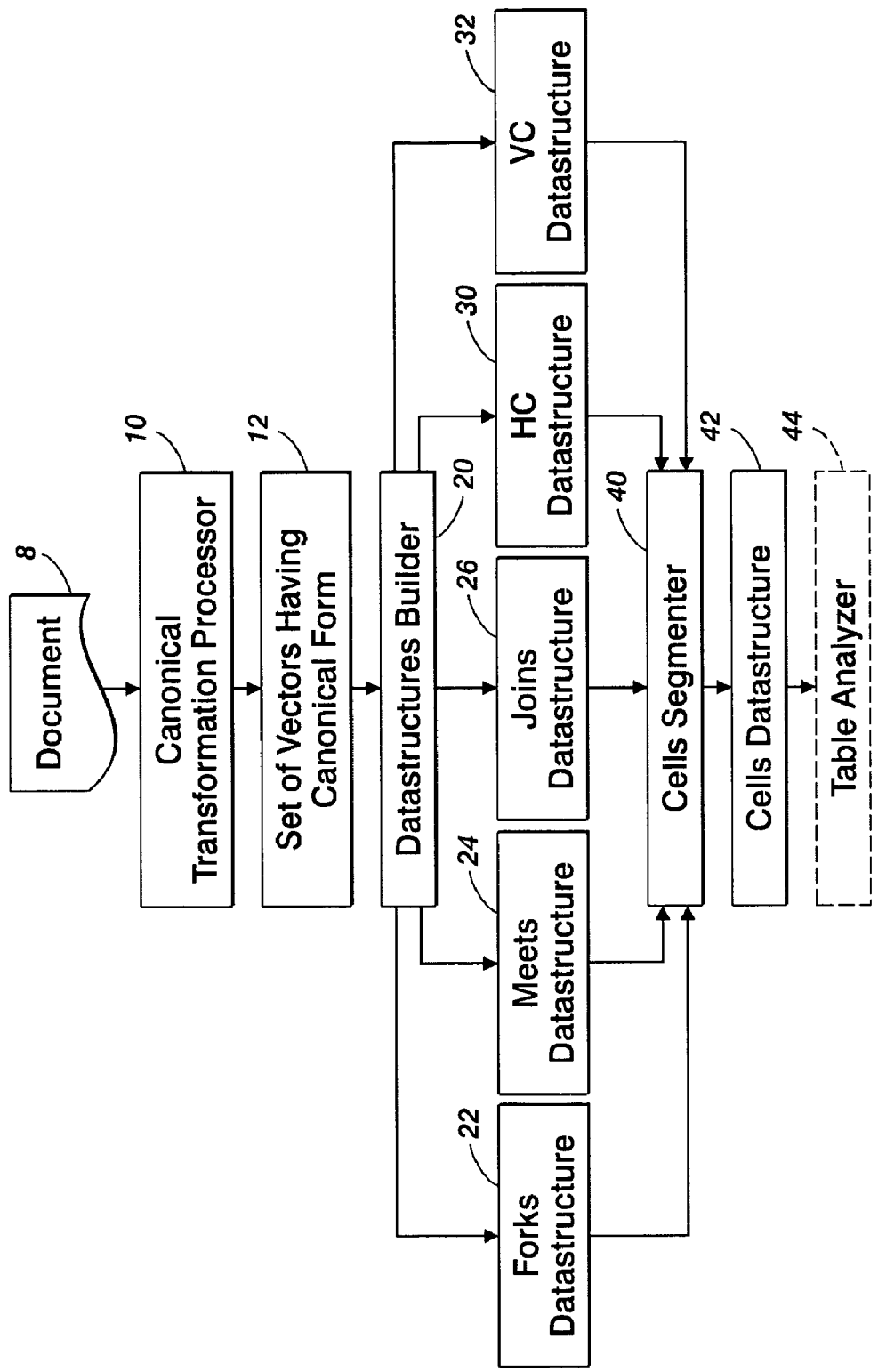
FIG. 1 diagrammatically shows a system for identifying cells of a table that is delineated by gridlines.

To facilitate setting forth the example embodiments, an example page description language (PDL) employing a vector-based line graphical language is described and employed herein to illustrate various example embodiments. The skilled artisan can readily adapt the example PDL employed herein to implement such embodiments in other formats such as portable document format (PDF), PostScript, scalable vector graphics (SVG), or so forth which employ vector-based graphical representations. The example PDL includes a linear plane for representing line graphic such as gridlines of a table. The PDL can be more complex. For example a more complex PDL including multiple planes with continuous X and Y coordinates, an abstract color model using three continuous red, green, and blue planes, graphical objects including text, lines, polylines, filled rectangles, filled polygons, clipping areas, coordinate transformations, and so forth is described in Vion-Dury, U.S. application Ser. No. 11/312,267 filed Dec. 20, 2005, entitled "Normalization of Vector-Based Graphical Representations" which is incorporated herein by reference in its entirety.

In the example PDL used herein, a discrete line graphical plane is defined with X-Y orthogonal axes, X being vertical and oriented from top to bottom, and Y being horizontal and oriented from left to right. Coordinates for vectors are mathematically expressed using relative integers. To facilitate conversion of graphical content into a unique canonical representation, a lexicographic ordering of starting and ending points for the vectors is defined. Substantially any lexicographic ordering can be defined or selected as long as it is used consistently. In the examples herein, the following example lexicographic ordering of points is selected: a point $p_1$ is less than a point $p_2$ if (i) the x-coordinate of $p_1$ is strictly smaller than the x-coordinate of $p_2$ or (ii) the points $p_1$ and $p_2$ have the same x-coordinate and the y-coordinate of $p_1$ is strictly smaller than the y-coordinate of $p_2$. Mathematically, this can be written as:

$$p_1 \prec p_2 \Leftrightarrow (p_1.x < p_2.x) \vee (p_1.x = p_2.x \wedge p_1.y < p_2.y) \qquad (1).$$

Using the lexicographic ordering of Equation (1), points are ordered primarily based on the x-coordinate, and secondarily based on the y-coordinate. This order can be shown to be total, irreflexive, asymmetric and transitive.

A vector or line segment (these terms being used interchangeably herein) is defined in the example lexicographic ordering by an oriented pair of points including: the starting point; the ending point; an optional color c; and an optional line width w. A well-formed line segment s is thus given by s=<$p_1$, $p_2$, c, w> where $p_1 \prec p_2$. Line segments are ordered in the example lexicographic ordering as:

$$<p_1,p_2,c,w> \prec <p_3,p_4,c',w'> \Leftrightarrow$$

$$(p_1 \prec p_3) \vee (p_1 = p_3 \wedge (p_2 \vee p_4 \prec (p_2 = p_4 \wedge (c < c' \vee (c = c' \wedge (w < w')))))) \qquad (2).$$

Using the lexicographic ordering of Equation (2), the line segments are ordered respective to coordinates of the starting and ending points, and are secondarily ordered respective to the line segment color and/or width.

The lexicographic ordering set forth in Equations (1) and (2) and related text is an example. Other lexicographic orderings can be used. For example, the ordering of points can be by y-coordinate first, then by x-coordinate if the y-coordinates of two points are equal. The lexicographic ordering that is selected should be used consistently so as to produce a unique canonical graphical representation. The approaches disclosed herein transform line graphics into vectors having a canonical form without vector overlaps or crossings.

The canonical vector-based representation is unique for given visual line graphical content regardless of the vector representation of the graphical content input to the defined canonical transformation algorithm. As a result, two visually identical images constructed in different ways (that is, having different vector-based representations) have the same canonical vector representation after processing by the canonical transformation algorithm. For example, a line segment of length L may be represented in a vector format using a single line segment, or using two abutting parallel line segments of lengths L/3 and 2 L/3, respectively, or using two overlapping parallel line segments of length 2 L/3 each with an overlap of L/3, or so forth. The visual appearance of these different representations is the same, namely a line segment of length L. Accordingly, the canonical transformation algorithm produces the same canonical vector representation for all such visually equivalent but different input vector representations. The canonical representation advantageously is not a dot-matrix representation, but rather retains a tractable vector-based abstraction level and does not inherently degrade resolution, although optionally the canonical transformation algorithm can incorporate a selected resolution or spatial granularity which can produce more compact or efficient canonical representations at the cost of being at the selected resolution or granularity.

Based on the examples disclosed herein, the skilled artisan can readily construct various canonical transformation algorithms producing vectors having a canonical form without vector overlaps or crossings. The canonical representation produced by a particular canonical transformation algorithm is unique for that algorithm; however, a different canonical transformation algorithm may produce for that same input graphical content a different canonical representation that is unique for that different canonical transformation algorithm.

With reference to FIG. 1, a document 8 is assumed to be in a format employing vector-based line graphics represented as vectors using the example PDL set forth herein. Documents in which line graphics are represented in a non-vector format, such as bitmapped documents, are optionally converted to produce the document 8 by a suitable converter program (not shown). A canonical transformation processor 10 converts the vector-based linear graphical content of the document 8 into a unique vector-based canonical form. The canonical transformation processor 10 receives as input linear graphical content of the document 8 including a graphical description g generated (in the examples shown herein) in conformance with the example PDL, as well as optional pixel geometry information (such as W and H values indicating the width and height of a pixel, respectively), and an optional color space definition (such as specified by a discrete resolution of each color plane; it will be appreciated that if the graphical content is two-tone such as black-and-white, then the color space definition is suitably omitted, and similarly if the graphical content is grayscale the optional color space definition suitably specifies grayscale levels of objects). Optionally various routine graphical pre-processing is performed such as defining a viewport, clipping portions of line segments to fit within the viewport, and so forth. Vectors or line segments of the document 8 are ordered in accordance with Equation (2) or another selected lexicographic ordering.

With continuing reference to FIG. 1 and with further reference to FIGS. 2 and 3, the canonical transformation processor 10 processes the ordered line segments of the document 8 to remove redundancies, overlaps, and crossings of line segments. In the case of overlapping segments, FIG. 2 illustrates suitable adjustments that are applicable when two parallel line segments designated $s_i=<p_1,p_2,c,w>$ and $s_j=<p_3,p_4,c,w>$, respectively, of substantially the same color and substantially common width are partially overlapping or wholly overlapping (that is, where one line is contained by another line). For example, if the ordering of the line segment points is such that $p_1 \prec p_3 \prec p_2 \prec p_4$, then a suitable adjustment is to shorten line segment $s_i$ by replacing its end point $p_2$ with point $p_3$ thus eliminating the overlap. If the ordering of the line segment points is such that $p_1 \cong p_3 \prec p_2 \prec p_4$, then a suitable adjustment is to shorten line segment $s_j$ by replacing its starting point $p_3$ with point $p_2$ thus eliminating the overlap. If the ordering of the line segment points is such that $p_1 \prec p_3 \prec p_4 \prec p_2$ (line segment $s_j$ contained by line segment $s_i$), then a suitable adjustment is to shorten line segment $s_i$ by replacing its end point $p_2$ with point $p_3$ to uncover line segment $s_j$ and to add a third line segment $<p_4,p_2,c,w>$ to span the portion of original line segment s; not covered by either the shortened line segment $s_i$ or line segment $s_j$. If the ordering of the line segment points is such that $p_1 \cong p_3 \prec p_4 \prec p_2$ (line segment $s_j$ contained by line segment $s_i$), then a suitable adjustment is to replace the two line segments $s_i$ and $s_j$ by non-overlapping line segments $<p_1,p_4,c,w>$ and $<p_4,p_2,c,w>$. If the ordering of the line segment points is such that $p_1 \prec p_3 \prec p_4 \cong p_2$ (line segment $s_j$ contained by line segment $s_i$), then a suitable adjustment is to shorten line segment $s_i$ by replacing its end point $p_2$ with point $p_3$ thus uncovering line segment $s_j$.

With reference to FIG. 3, the canonical transformation processor 10 also makes adjustments to remove crossings of non-parallel vectors or line segments. The line segment crossing is removed by replacing the crossed line segment or line segments by equivalent line segments having starting or end points at the crossing point. Still further, the line segments overlap removal processor 40 suitably removes thinner line segments that are overlapped by thicker line segments. For example, given two line segments $<p_1,p_2,c,w>$ and $<p_1,p_2,c,w'>$ where w>w', the line segment $<p_1,p_2,c,w'>$ is suitably removed.

FIG. 2 shows suitable adjustments for horizontal overlapping line segments and FIG. 3 for crossing horizontal and vertical lines. However, the adjustments of FIGS. 2 and 3 are readily employed for non-horizontal overlapping lines and for non-horizontal and/or non-vertical crossing line segments, and for non-orthogonal line segment crossings. In other embodiments, the canonical transformation processor 10 performs a filtering to remove vectors or line segments that are not horizontal and are not vertical, since table gridlines are typically horizontal or vertical. Filtering out non-horizontal and non-vertical lines increases computational speed but may reduce robustness against, for example, graphics which are skewed or rotated by a small angle respective to the X-Y coordinate system. Moreover, the techniques disclosed herein are suitably adapted to cell identification in non-rectangular grids, in which case filtering to remove vectors that are not horizontal and are not vertical is inappropriate.

Figure 4:
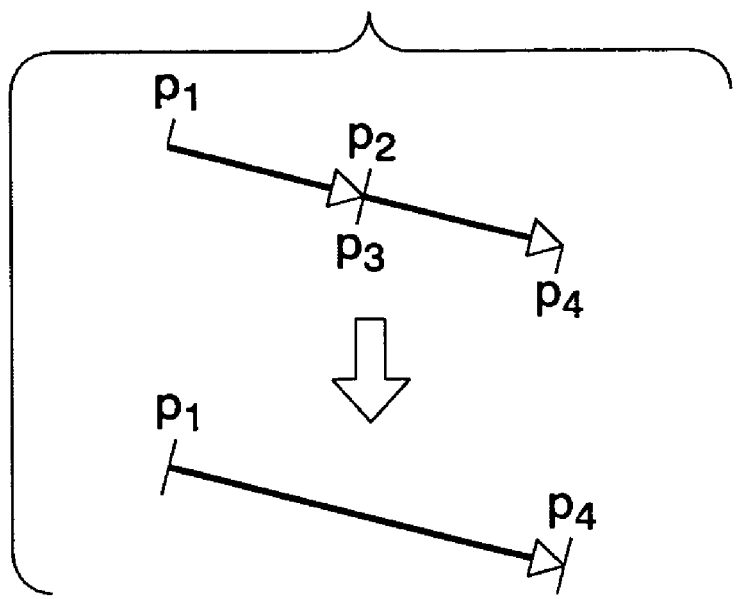
FIG. 4 diagrammatically shows suitable adjustments performed by the vectors converter of FIG. 1 to remove vector redundancies.
Figure 5:
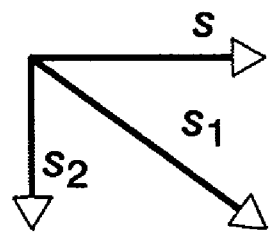
FIG. 5 diagrammatically shows vectors s, $s_1$, and $s_2$ associated with a datastructure Forks(s)=[$s_1,s_2$].

With continuing reference to FIG. 1 and with further reference to FIG. 4, the canonical transformation processor 10 also combines parallel adjacent segments of substantially the same color and substantially common width to remove vector redundancies. As shown in FIG. 4, two line segments $<p_1,p_2,c,w>$ and $<p_3,p_4,c,w>$ are parallel and have substantially the same color and substantially common width. Moreover, the ending point $p_2$ of the first line segment is substantially the same as the starting point $p_3$ of the second line segment (that is, $p_2 \cong p_3$), and the joining point (that is, $p_2 \cong p_3$) is not the location of a crossing, starting, or ending of a third line segment. The combination of the two parallel line segments $<p_1,p_2,c,w>$ and $<p_3,p_4,c,w>$ is therefore not unique, since the joining point (that is, $p_2 \cong p_3$) could be located anywhere between $p_1$ and $p_4$. Accordingly, to ensure a unique canonical graphical representation the two parallel adjacent segments are suitably replaced by a single unique line segment $<p_1,p_4,c,w>$ that spans the same length as the original two fragmented line segments.

With continuing reference to FIG. 1, in some embodiments the canonical transformation processor 10 suitably operates iteratively. After an initial pass in which line crossings, overlaps, and parallel redundancies are removed, the canonical transformation processor 10 checks whether the line graphics are now in canonical form. If overlaps, crossings, or parallel redundancies remain, then another iteration of processing is performed, and the canonical transformation processor 10 is iteratively applied until an ordered set of vectors 12 having canonical form without vector overlaps, crossings, or redundancies and ordered in accordance with Equation (2) is achieved.

Adjustment of overlapping or covered lines using adjustments illustrated in FIG. 2, or de-fragmenting of joining lines as shown in FIG. 4, is applied when the lines have substantially common width. In some embodiments, this corresponds to exactly the same width, so that two line segments $<p_1,p_2,c,w>$ and $<p_3,p_4,c,w'>$ have substantially common width if w=w'. In other embodiments, substantially common width is defined respective to the resolution of the anticipated graphical rendering, or is defined respective to a selected granularity of pixel resolution. For example, if the difference between w and w' is less than a pixel size of an anticipated rendering (such as the resolution of a printer or display device to be used for the rendering), or is less than a selected granularity, then line segments of widths w and w' are considered to have substantially common width. In some embodiments such as line drawings using a uniform line width, the width attribute of line segments may be omitted, and all line segments are considered to have the same width, that is, all line segments are considered to have substantially common width.

Similarly, the line segment adjustments and joinings of FIGS. 2, 3, and 4 are performed for line segments of substantially the same color. In some embodiments, this corresponds to exactly the same color as set forth for example by an RGB triplet or other color representation. In other embodiments, substantially the same color is defined respective to a color resolution or granularity. For example, if the color difference between two colors c and c' is less than a selected color granularity (as measured, for example, by a difference in CIE color coordinates or by another suitable color difference measure), then the colors c and c' are considered to be substantially the same color. In the case of grayscale graphical content, the term "color" corresponds to a grayscale intensity, and c and c' can be considered to be substantially the same color if (in some embodiments) grayscale c=grayscale c', or if (in other embodiments) a difference between grayscale c and grayscale c' is less than a selected grayscale granularity. If the graphical content is two-tone (such as black-and-white with no shades of gray in-between) then the color attribute is optionally omitted and all line segments have a common color. Still further, in some embodiments the term "color" as applied to a line segment may also incorporate a line-type attribute. For example, two line segments may have the same RGB triplet or the same grayscale intensity, but may nonetheless be considered to be of different colors because the two line segments have different line-types, such as one being a solid line segment and the other being a dotted line segment or a dashed line segment.

Moreover, respecting color, grayscale value, line width, line type, or other line attributes, for the purposes of cell delineation such distinctions may optionally be overlooked in constructing the set of canonical vectors 12. For example, in some cases the grid of a table may use lines of different line widths, such as a thicker line delineating the outermost border of the table, or a thick horizontal line separating table header cells from the body cells of the table, or a thick vertical line separating row label cells from the content cells of the row, or so forth. Accordingly, in some embodiments some or all of w, c, or other line attributes of a line (e.g., of a line $<p_1,p_2,c,w>$) may be overlooked in determining line crossings, overlaps, and redundancies.

While example embodiments of the canonical transformation processor 10 are described herein respective to the example PDL graphical language for representing linear graphics set forth herein, the skilled artisan can readily adapt the described example embodiments of the canonical transformation processor 10 or their equivalents for use with commercial or non-commercial vector-based graphical languages such as portable document format (PDF), PostScript, scalable vector graphics (SVG), or so forth. Similarly while example embodiments of the canonical transformation processor 10 are described herein respective to the example lexicographic ordering set forth with reference to Equations (1) and (2), the skilled artisan can readily employ other lexicographic orderings used consistently by the canonical transformation processor so that the canonical transformation processor produces a canonical output with a unique ordering of non-overlapping, non-crossing, and non-redundant vectors or line segments.

With continuing reference to FIG. 1, the set of canonical vectors 12 is used in delineating cells of a table or other rectangular features of interest. In general, a cell will have an upper-left corner point that is the common starting point of a horizontal canonical vector and a vertical canonical vector, and will also have a lower-right corner point that is the common ending point of a horizontal canonical vector and a vertical canonical vector. Additional joining vectors may be included in defining one or more horizontal or vertical delineating boundaries of the cell. Accordingly, a datastructures builder 20 determines various vector connections of interest, such as vector forks, vector meets, vector joins, and sets of joining horizontal or vertical vectors.

With continuing reference to FIG. 1 and with further reference to FIGS. 5, 6, 7, 8, and 9, several example datastructures are set forth in turn. For example, the datastructures builder 20 determines forks datastructures 22. As shown in example FIG. 5, each forks datastructure identifies all vectors that have a common starting point with a vector of interest. Hence, the datastructure Forks(s) denotes the set of vectors (possibly an empty set) that have a common starting point with the vector s. In example FIG. 5, Forks(s)=$[s_1,s_2]$ since vectors s, $s_1$, and $s_2$ all have a common starting point. Mathematically, the Forks(s) datastructure for a vector $s=<p_1,p_2>$ is the sub-set of all other vectors in the set of canonical vectors 12 having the form $<p_1,p_i>$ where $p_i$ can be any end point other than $p_2$ satisfying the condition $p_1 \prec p_i$.

Figure 6:
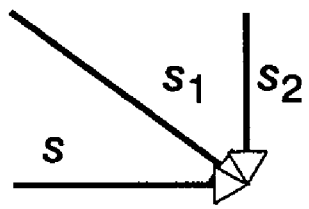
FIG. 6 diagrammatically shows vectors s, $s_1$, and $s_2$ associated with a datastructure Meets(s)=[$s_1,s_2$].

With reference to FIGS. 1 and 6, the example datastructures builder 20 also determines meets datastructures 24. As shown in example FIG. 6, each meets datastructure identifies all vectors that have a common ending point (i.e, meet) with a vector of interest. Hence, the datastructure Meets(s) denotes the set of vectors (possibly an empty set) that have a common ending point with the vector s. In example FIG. 6, Meets(s)= $[s_1,s_2]$ since vectors s, $s_1$, and $s_2$ all have a common ending point. Mathematically, the Meets(s) datastructure for a vector $s=<p_1,p_2>$ is the sub-set of all other vectors in the set of canonical vectors 12 having the form $<p_i,p_2>$ where $p_i$ can be any starting point other than $p_1$ satisfying the condition $p_i \prec p_2$.

Figure 7:
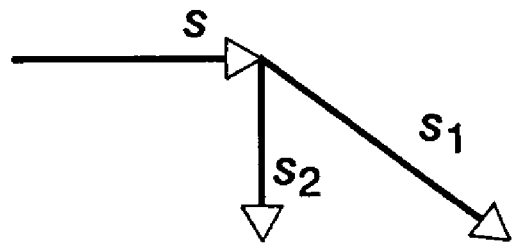
FIG. 7 diagrammatically shows vectors s, $s_1$, and $s_2$ associated with a datastructure Joins(s)=[$s_1,s_2$].

With reference to FIGS. 1 and 7, the example datastructures builder 20 also determines joins datastructures 26. As shown in example FIG. 7, each joins datastructure identifies all vectors having a starting point in common with (i.e, joining) the ending point of a vector of interest. Hence, the datastructure Joins(s) denotes the set of vectors (possibly an empty set) that have a starting point that coincides with the ending point of the vector s. In example FIG. 7, Joins(s)=$[s_1, s_2]$ since vectors $s_1$, and $s_2$ each have a starting point joining the ending point of the vector s. Mathematically, the Joins(s) datastructure for a vector $s=<p_1,p_2>$ is the sub-set of all other vectors in the set of canonical vectors 12 having the form $<p_2,p_i>$ where $p_i$ can be any ending point satisfying the condition $p_2 \prec p_i$.

In each of the datastructures 22, 24, 26, it is to be understood that the common starting point (in the case of forks), common ending point (in the case of meets), or common joining point (in the case of joins) may in some embodiments require precise mathematical identity, or in other embodiments may allow for some coarseness in the resolution. As an example of the latter case, a vector $<p_3,p_4>$ may be determined to fork from vector $<p_1,p_2>$ (that is, have a common starting point) if $p_3$ is within a certain small distance from $p_i$ (that is, $p_i \cong p_3$), whereas in the former case exact identity (that is, $p_1=p_3$ exactly) is required.

Figure 8:
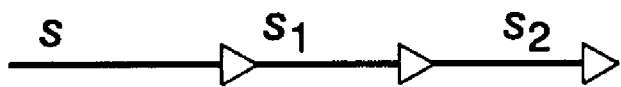
FIG. 8 diagrammatically shows vectors s, $s_1$, and $s_2$ of a datastructure HC(s)=[s,$s_1,s_2$] (or equivalently, HCS($s_2$)=[$s_2$, $s_1$,s]).

With reference to FIGS. 1 and 8, the example datastructures builder 20 also determines horizontal continuity (HC) datastructures 30. As shown in example FIG. 8, each HC datastructure identifies a sequence of horizontal vectors s, $s_1$, $s_2$, . . . in which each subsequent vector joins the previous vector in the sequence. Mathematically, the datastructure HC(s) denotes the set of horizontal vectors $s=<p_1,p_2>$, $s_1=<p_2,p_3>$, $s_2=<p_3,p_4>$, ... where $p_1 \prec p_2 \prec p_3 \prec p_4$. ... In the formalism used herein, the datastructure HC(s) contains at least the horizontal vector s, although it is also contemplated to employ analogous horizontal continuity datastructures that do not contain the input horizontal vector s. In example FIG. 8, HC(s)=[s,$s_1,s_2$] since vector $s_1$ is a horizontal vector joining horizontal vector s and vector $s_2$ is a horizontal vector joining horizontal vector $s_1$. Optionally, a corresponding symmetrical datastructure HCS is defined to denote the reverse sequence of horizontal joining vectors, that is, HCS($s_2$)=[$s_2$, $s_1$,s]. The symmetry relation:

$$\forall s, \forall s_i, s_i \in HC(s) \Leftrightarrow s \in HCS(s_i) \qquad (3)$$

holds for the symmetrical HC and HCS datastructures.

Figure 9:
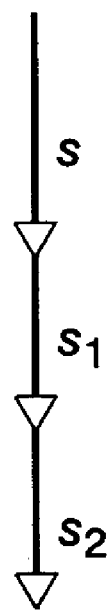
FIG. 9 diagrammatically shows vectors s, $s_1$, and $s_2$ of a datastructure VC(s)=[s,$s_1,s_2$] (or equivalently, VCS($s_2$)=[$s_2$, $s_1$,s]).

With reference to FIGS. 1 and 9, the example datastructures builder 20 also determines vertical continuity (VC) datastructures 32. As shown in example FIG. 9, each VC datastructure identifies a sequence of vertical vectors s, $s_1$, $s_2$, ... in which each subsequent vector joins the previous vector in the sequence. Mathematically, the datastructure VC(s) denotes the sequence of vertical vectors $s=<p_1,p_2>$, $s_1=<p_2,p_3>$, $s_2=<p_3,p_4>$, ... where $p_1 \prec p_2 \prec p_3 \prec p_4$ ... In the formalism used herein, the datastructure VC(s) contains at least the vertical vector s, although it is also contemplated to employ analogous vertical continuity datastructures that do not contain the input vertical vector s. In example FIG. 9, VC(s)=[s,$s_1,s_2$] since vector $s_1$ is a vertical vector joining vertical vector s and vector $s_2$ is a vertical vector joining vertical vector $s_1$. Optionally, a corresponding symmetrical datastructure VCS is defined to denote the reverse sequence of vertical joining vectors, that is, VCS($s_2$)=[$s_2,s_1$,s]. The symmetry relation:

$$\forall s, \forall s_i, s_i \in VC(s) \Leftrightarrow s \in VCS(s_i) \qquad (4)$$

holds for the symmetrical VC and VCS datastructures.

The vector connection datastructures 22, 24, 26, 30, 32 can be created and stored in various ways. In some embodiments, the datastructures 22, 24, 26, 30, 32 are stored as hash tables, which are data structures that associate keys with values and efficiently support lookup operations. Hence, the datastructure Forks(s), for example, can be stored as a hash table in which the input vector s serves as the key for locating vectors that fork from (that is, have a common starting point with) the input key vector s. A single hash table Forks(s) thus conveniently identifies all forking vectors from any chosen input vector. Similarly, hash tables can be used to represent and manipulate the Meets, Joins, HC, HCS, VC, VCS, or other vector connection datastructures. Alternatively, the datastructures can be stored in other formats, such as arrays, lists, or so forth.

In some embodiments, the datastructures builder 20 builds the datastructures 22, 24, 26, 30, 32 as follows. Each of the Forks, Meets, and Joins hash tables 22, 24, 26 are built using a single pass through the set of canonical vectors 12. For example, the following algorithm (denoted Algorithm #1 herein) suitably constructs the Forks(s), Meets(s), and Joins (s) datastructures:

(i) for each consecutive pair of vectors $s_i=<p_1,p_2>$ and $s_j=<p_3,p_4>$ in the ordered list of canonical vectors 12—
 a. if $p_1=p_3$ then update Forks($s_i$) with $s_j$
 b. else if $p_2=p_3$ then update Joins($s_i$) with $s_j$
 c. else if $p_2=p_4$ then update Meets($s_j$) with $s_i$ The relative simplicity of the above Algorithm #1 is due to the strong properties of the set of canonical vectors 12 which do not include any overlapping, crossing, or redundant vectors.

Once the Forks, Meets, and Joins datastructures 22, 24, 26 are generated, the HC and VC datastructures 30, 32 are suitably constructed using the following algorithm (denoted Algorithm #2 herein):

(i) for each horizontal vector s in the set of canonical vectors 12—
 a. initialize HC(s) 30 and HCS(s) with the vector s;
(ii) for each vertical vector s in the set of canonical vectors 12—
 a. initialize VC(s) 32 and VCS(s) with the vector s;
(iii) for each vector $s_i$ in the set of canonical vectors 12—
 a. for each vector $s_j$ in joins($s_i$)—
  i. if $s_j$ is horizontal then update HCS($s_j$) with HCS($s_i$) and for each vector $s_k$ in HCS($s_j$) update HC($s_k$) 30 with $s_i$
  ii. if $s_j$ is vertical then update VCS($s_j$) with VCS($s_i$) and for each vector $s_k$ in VCS($s_j$) update VC($s_k$) 32 with $s_i$ which uses the optional symmetric datastructures HCS and VCS to populate the respective direct datastructures HC 30 and VC 32.

The example datastructures 22, 24, 26, 30, 32 constructed using Algorithms #1 and #2 have certain properties, such as:
 (P1) segment sequences returned by hash tables are ordered accordance with the lexicographic ordering of segments in the plane;
 (P2a) if s is a vertical segment, then VC(s) returns a sequence which first element is s;
 (P2b) if s is not a horizontal segment, then HC(s) returns an empty sequence;
 (P3a) if s is not a vertical segment, then VC(s) returns an empty sequence;
 (P3b) if s is a horizontal segment, then HC(s) returns a sequence which first element is s;
 (P4) the relations Joins, Forks, Meets are disjoint—e.g. x in Joins(y) implies NOT (x in Forks(y)); and
 (P5) the relations Joins, Forks, Meets are areflexive—e.g. ¬x in joins(x).

If the set of canonical vectors 12 contains only vertical and horizontal vectors, for example due to optional filtering performed by the canonical transformation processor 10, then the following additional properties hold:
 (P2c) if s is a vertical segment, then Forks(s) returns 0 or 1 horizontal segment.
 (P2d) if s is a vertical segment then Meets(s) returns 0 segments.
 (P3c) if s is a horizontal segment then Forks(s) return 0 segments.
 (P3d) if s is a horizontal segment then Meets(s) returns 0 or 1 vertical segment.

These properties should be observed after applying successively the Algorithm #1 on the ordered set of canonical vectors 12.

With continuing reference to FIG. 1, the datastructures 22, 24, 26, 30, 32 are referenced by a cells segmenter 40 to identify a sub-set of the set of vectors 12 defining a rectangle delineating a cell. The sub-set of vectors includes at least: (i) two vectors having common starting points (suitably identified by referencing the Forks datastructure 22); and (ii) two vectors having common ending points (suitably identified by referencing the Meets datastructure 24). Thus, each cell is delineated by at least four vectors (namely, two forking vectors and two meeting vectors). However, additional connecting vectors may be included in the cell-delineating rectangle. More generally, the cells segmenter 40 identifies a cell delineated by a set of vector chains including at least forking first horizontal and vertical vector chains, a second horizontal vector chain joining a vector of the first vertical vector chain, and a second vertical vector chain joining a vector of the first horizontal vector chain, in which the second horizontal and second vertical vector chains including meeting horizontal and vertical vectors. Each of the vector chains delineating the cell includes at least one vector.

Figure 10:
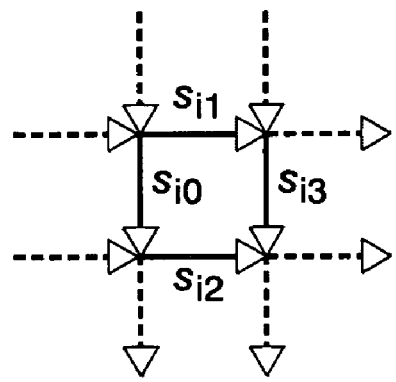
FIG. 10 diagrammatically shows an illustrative example minimal cell delineated by a pair of forking vectors and a pair of meeting vectors.

With reference to FIG. 10, an example is shown in which exactly four vectors, namely two forking vectors $s_{i0}$ and $s_{i1}$ having common starting points and two meeting vectors $s_{i2}$ and $s_{i3}$ having common ending points, define a minimal cell. The subscript notation i0, i1, i2, i3 indicates the index ordering of the vectors in the canonical form, and for the minimal cell of FIG. 10 follows the relationship: i1=i0+1; i2=i1+1; and i3=i2+m where m>1. For such a minimal cell, the four vector chains delineating the cell each include a single vector.

Figure 11:
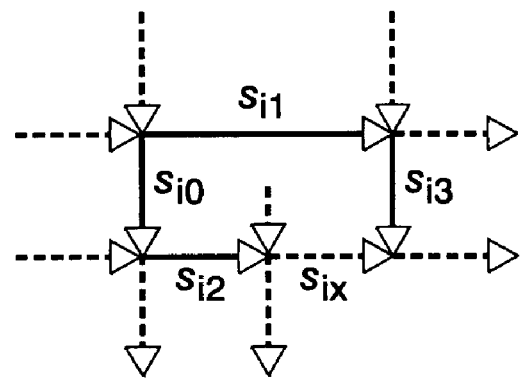
FIG. 11 diagrammatically shows an illustrative example minimal cell delineated by a pair of forking vectors, a pair of meeting vectors, and one or more additional horizontal vectors.
Figure 12:
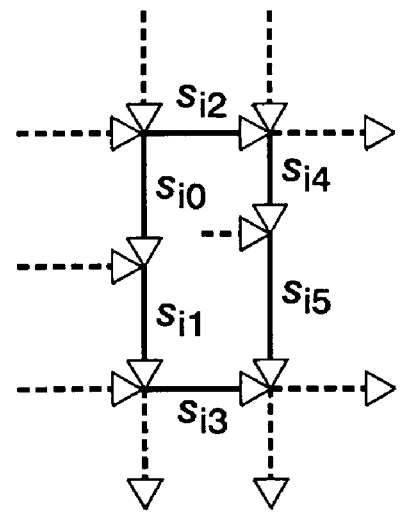
FIG. 12 diagrammatically shows an illustrative example minimal cell delineated by a pair of forking vectors, a pair of meeting vectors, and two additional vertical vectors.

With reference to FIGS. 11 and 12, two other examples of minimal cells are shown. Each of these minimal cells is defined by five or more vectors including (i,ii) two forking vectors, (iii,iv) two meeting vectors, and (v) at least one additional vector that is additional to the forking horizontal and vertical vectors and the meeting horizontal and vertical vectors. In FIG. 11, a minimal cell is delineated by five vectors denoted slot $s_{i0}$, $s_{i1}$, $s_{i2}$, $s_{i3}$, $s_{ix}$, and the canonical indices i0, i1, i2, i3 follow the relationships: i1=i0+1; i2=i1+1; and i3=i2+m where m>1. In FIG. 12, a minimal cell is delineated by six vectors denoted $s_{i0}$, $s_{i1}$, $s_{i2}$, $s_{i3}$, $s_{i4}$, $s_{i5}$, and the canonical indices i0, i1, i2, i3, i4, i5 follow the relationships: i1=i0+1; i2=i1+m; i3=i2+1; i4=i3+n; i5=i4+1; where m>1 and n>1.

Figures 13, 14:
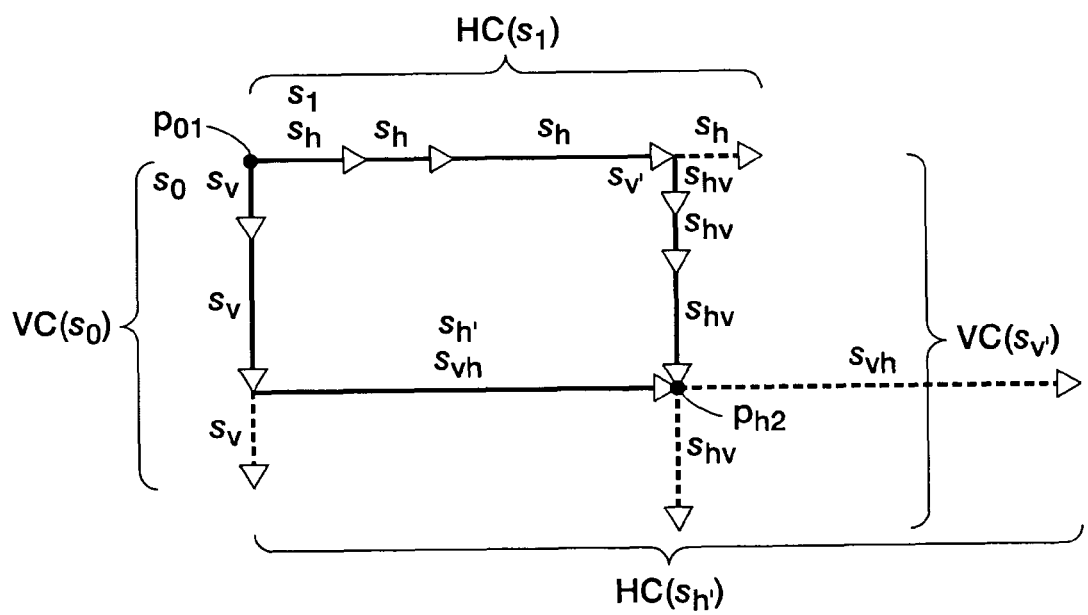
FIG. 13 diagrammatically shows an example table.
FIG. 14 diagrammatically shows vectors and datastructures involved in identifying vectors of a rectangle delineating a cell.

With reference to FIG. 13, a non-minimal cell encloses two or more minimal cells. In the example table of FIG. 13, minimal cells are labeled "Minimal." A non-minimal cell denoted NMC is highlighted by a bold rectangle, and contains seven of the minimal cells. The non-minimal cell NMC corresponds to a column of the table. It should be noted that the table of FIG. 13 includes many other non-minimal cells besides the labeled example non-minimal cell NMC, which other non-minimal cells are not labeled or highlighted in FIG. 13. For example, each column and each row of the table is a non-minimal cell, and each contiguous group of two or more cells having a rectangular boundary is a non-minimal cell.

With returning reference to FIG. 1 and with further reference to FIG. 14, in one example embodiment the cells segmenter 40 identifies every cell of a table, including both minimal cells and non-minimal cells, using the following example algorithm denoted Algorithm #3 herein:

```
1.   for all segments s₀ = <p₀₁ p₀₂>
2.     for all segments sᵥ in VC(s₀)
3.       for all segments s₁ in forks(s₀)
4.         for all segments sₕ in HC(s₁)
5.           if joins(sᵥ) = [... sₕ'] then
6.             for all segments sᵥₕ = <pₕ₁ pₕ₂> in HC(sₕ')
7.               if joins(sₕ) = [sᵥ'...] then
8.                 for all segments sₕᵥ in VC(sᵥ')
9.                   if sₕᵥ in meets(sᵥₕ) then
10.                    append cell(p₀₁,pₕ₂) in result list
```

FIG. 14 diagrammatically shows the vectors and vector chains involved in Algorithm #3. The first loop of Algorithm #3 scans the input sequence of vectors 12 in order, selecting all vertical segments forking some other segments $s_1$. Only those $s_1$ vectors which are horizontal are considered (see line 5 of Algorithm #3), since otherwise HC($s_1$) would be empty (see property P2b given previously). The same remark hold for segments $s_h$, and $s_v$, with respectively HC and VC (see properties P2b, P3a given previously). When iterating, the first value taken by $s_v$ is $s_0$ and the first value taken by $s_h$ is $s_1$ (see properties P2a, P3b), and this ensures that minimal rectangles defining minimal cells are captured. Matching patterns are found and appended to the result list (see line 10 of Algorithm #3). 1. If segments are exclusively either vertical or horizontal (for example, if the canonical transformation processor 10 filters out non-vertical and non-horizontal lines), then some optimizations can be obtained using properties of joins and meets (see properties P2c, P2d, P3c, P3d given previously). Although Algorithm #3 operates on horizontal and vertical lines, it is contemplated to generalize the cell-identification algorithm to capture rectangles among other axes by building suitable closure tables.

In some embodiments, it may be desired to find only minimal cells. For example, in a conventional rectangular grid table in which no cells are merged or split, each minimal cell typically corresponds to a space for a table entry. In contrast, the non-minimal cells in such a conventional rectangular grid table represent various groupings of minimal cells and do not correspond one-to-one with spaces for table entries.

Accordingly, in another example embodiment the cells segmenter 40 identifies only minimal cells of a table, using the following example algorithm denoted Algorithm #4 herein:

```
1.   for all vertical segments s₀ = <p₀₁ p₀₂>
2.     for all segments s₁ in forks(s₀)
3.       for all segments sₕ in HC(s₁)
4.         for all segments sᵥ in VC(s₀)
5.           if joins(sᵥ) = [sᵥᵥ'... sₕ'] then
6.             for all segments sᵥₕ = <pₕ₁ pₕ₂> in HC(sₕ')
7.               if joins(sₕ) = [sᵥ'...] then
8.                 for all segments sₕᵥ in VC(sᵥ')
9.                   if sₕᵥ in meets(sᵥₕ) then
10.                    append cell(p₀₁,pₕ₂) in result list;
11.                    continue the loop 1. starting from
12.                      sᵥᵥ' if vertical(sᵥᵥ')
13.                      sᵥ otherwise
```

Compared with the Algorithm #3, in the Algorithm #4 lines 11-13 step over the following starting segment, thus searching for the next top-left corner rather than exploring all overlapping rectangles for that corner.

For a square rectangular table having N×N cells with no merging or splitting of minimal cells, the total number of minimal cells is $N^2$ which is of order $O(n^2)$. In contrast, the total number of cells including both minimal cells and non-minimal cells is substantially larger, and is given by:

$$\left(\frac{n(n+1)}{2}\right)^2, \tag{5}$$

which is of order $O(n^4)$. As a quantitative example, an 8×8 square rectangular grid table has $(8)^2=64$ minimal cells and $[8\times(8+1)/2]^2=1{,}296$ total cells including both minimal and non-minimal cells.

The output of the cells segmenter 40 is a cells datastructure 42 indicating the identified cells. For example, each cell can be suitably represented by an ordered pair of points $(p_{ul}, p_{lr})$ where $p_{ul}$ denotes the upper left corner of the cell and $p_{lr}$ denotes the lower right corner of the cell. Other representations are also suitable, such as representing each cell by the set of vectors delineating the cell boundary. The resulting cells datastructure 42 can be used in various ways. For example, in some embodiments an optional table analyzer 44 uses the cells datastructure 42 to identify cells from which to extract useful information, such as the contents of content spaces defined by the minimal cells.

Figure 15:
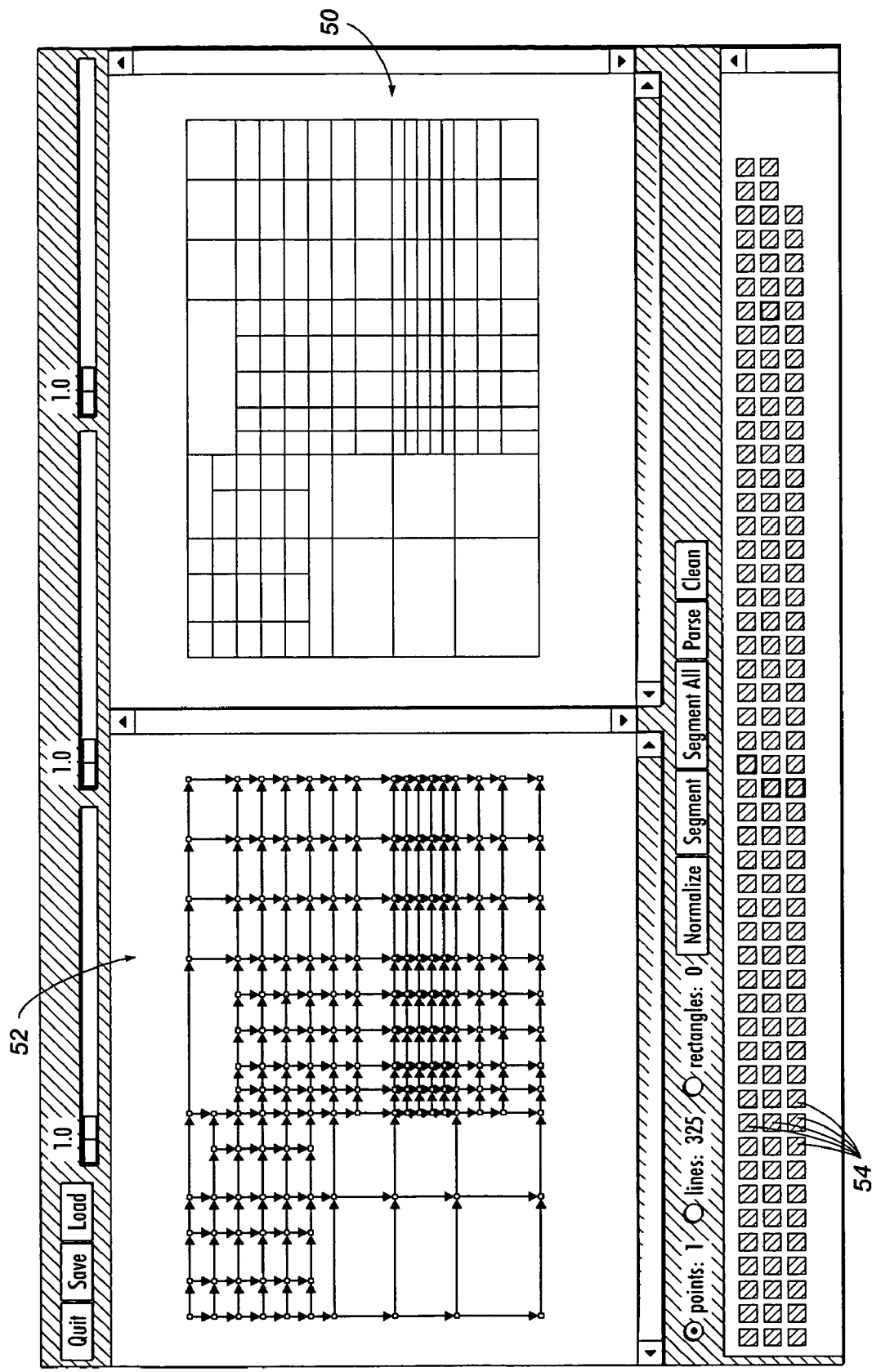
FIG. 15 shows a screenshot of an example table analyzer.

With continuing reference to FIG. 1 and with further reference to FIG. 15, a screenshot generated by an example embodiment of the table analyzer 44 is illustrated. In the right-hand window 50, a source table grid is displayed, while in a left-hand window 52 the corresponding canonical vectors 12 are displayed. A bottom portion of the display shows cell icons 54—each icon represents a single minimal cell of the table.

The disclosed cell identification techniques can be implemented in various ways. In some embodiments, an apparatus includes one or more processors and other components such as the example illustrated components 10, 20, 40, 44 implemented as executable software running on one or more computers or other digital devices to implement one or more embodiments of the disclosed cell identification techniques. In some embodiments, a storage medium such as an optical disk, magnetic disk, magnetic tape, FLASH memory, random access memory (RAM), read-only-memory (ROM), network server data storage, or so forth stores instructions executable to perform one or more embodiments of the disclosed cell identification techniques. These are merely example physical implementations—other physical implementations are also contemplated.

The term "cell" as used herein is to be broadly construed as any space delineated by gridlines. In the examples herein, the cells are table cells of a grid-delineated table. However, the cells may also be images delineated by line graphical borders, boxes of a flowchart, or other regions or spaces delineated by line graphical closed paths.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for identifying cells, the method comprising:
converting line graphics into vectors having a canonical form without vector overlaps or crossings;
associating connecting vectors including (i) forking vectors having common starting points, and (ii) meeting vectors having common ending points, the associating including:
generating a forks hash table configured to output a set of zero or more vectors forking from a received input vector; and
generating a meets hash table configured to output a set of zero or more vectors meeting with a received input vector; and
identifying a set of vectors including at least two forking vectors and two meeting vectors cooperatively defining a cell.

2. The method as set forth in claim 1, wherein the associating further comprises:

associating (iii) joining vectors in which an ending point of one vector is common with the starting point of the another vector by generating a joins hash table configured to output a set of zero or more vectors joining a received input vector.

3. The method as set forth in claim 2, wherein the associating further comprises:
associating (iv) horizontal joining vector chains and (v) vertical joining vector chains by generating one or more additional hash tables configured to output a horizontal or vertical joining vector chain including at least a received input horizontal or vertical vector.

4. The method as set forth in claim 3, wherein the identifying comprises:
identifying a set of vector chains including at least forking first horizontal and vertical vector chains, a second horizontal vector chain joining a vector of the first vertical vector chain, and a second vertical vector chain joining a vector of the first horizontal vector chain, the second horizontal and second vertical vector chains including meeting horizontal and vertical vectors.

5. The method as set forth in claim 1, further comprising:
filtering the vectors having a canonical form to remove vectors that are not horizontal and are not vertical, such that the set of vectors cooperatively define the cell as a rectangular cell.

6. The method as set forth in claim 1, wherein the identifying comprises:
identifying horizontal vector chains each including one or more horizontal vectors associated by zero or more joining connections;
identifying vertical vector chains each including one or more vertical vectors associated by zero or more joining connections; and
identifying the set of vectors cooperatively defining the cell as (i) two different horizontal vector chains and (ii) two different vertical vector chains.

7. The method as set forth in claim 1, wherein the identifying comprises:
identifying forking first horizontal and vertical vector chains each including one or more joining vectors;
identifying a second horizontal vector chain including one or more joining horizontal vectors joining a vector of the first vertical vector chain; and
identifying a second vertical vector chain including one or more joining vertical vectors joining a vector of the first horizontal vector chain.

8. The method as set forth in claim 1, wherein the identifying comprises:
identifying a first vertical vector chain of one or more joining vertical vectors ($s_v$) and a first horizontal vector chain of one or more joining horizontal vectors ($s_h$), a lowest order vertical vector of the first vertical vector chain and a lowest order horizontal vector of the first horizontal vector chain being forking vectors having a common starting point ($P_{01}$);
identifying a secondary horizontal vector chain of one or more joining horizontal vectors ($s_{vh}$) joining one of the vertical vectors ($s_v$) of the vertical vector chain;
identifying a secondary vertical vector chain of one or more joining vertical vectors ($s_{hv}$) joining one of the horizontal vectors ($s_h$) of the horizontal vector chain; and
identifying a cell having a first corner at the common starting point ($P_{01}$) a second corner at a meeting point ($p_{h2}$) of a horizontal vector ($s_{vh}$) of the secondary horizontal vector chain and a vertical vector ($s_{hv}$) of the secondary vertical vector chain.

9. A storage medium
storing instructions executable to perform a method for identifying cells delineated by horizontal and vertical gridlines, the method including converting the gridlines into a set of non-redundant horizontal and vertical vectors without vector overlaps or crossings, and identifying a set of connecting vectors from the set of non-redundant horizontal and vertical vectors defining a rectangle, the set of connecting vectors including at least (i) a horizontal forking vector and a vertical forking vector having a common starting point defining a first corner of the rectangle, and (ii) a horizontal meeting vector and a vertical meeting vector having a common ending point defining an opposite second corner of the rectangle, wherein the stored instructions are further executable to generate hash tables indicating connections between vectors of the set of non-redundant horizontal and vertical vectors, the indicated connections including at least forks in which the connected vectors have a common starting point and meets in which the connected vectors have a common ending point, the generated hash tables being used in the identifying of the set of connecting vectors defining the rectangle.

10. The storage medium as set forth in claim 9,
wherein the identifying of the set of connecting vectors further includes identifying at least one joining vector that is not a member of the group of vectors consisting of the horizontal forking vector, the vertical forking vector, the horizontal meeting vector, and the vertical meeting vector, the joining vector having at least one of (i) a starting point common with an ending point of the horizontal or vertical forking vector and (ii) an ending point common with a starting point of one of the horizontal or vertical meeting vectors.

11. The storage medium as set forth in claim 9, wherein the generated hash tables further indicate join connections in which one vector has a starting point in common with the ending point of another vector.

12. The storage medium as set forth in claim 9,
wherein the instructions are executable to repeat the identifying to delineate each minimal and each non-minimal cell of a table.

13. The storage medium as set forth in claim 9,
wherein the instructions are executable to repeat the identifying to delineate each minimal cell of a table without delineating non-minimal cells of the table.

14. The storage medium as set forth in claim 9,
wherein the converting of grid lines includes filtering the vectors to remove vectors that are not horizontal and are not vertical.

15. An apparatus for identifying table cells, the apparatus comprising:
a canonical transform processor configured to convert gridlines into a set of non-redundant, non-overlapping, and non-crossing vectors;
a datastructures builder configured to construct datastructures associating vectors of the set of vectors with other vectors of the set of vectors having common starting points or common ending points, wherein the datastructures constructed by the datastructures builder comprise hash tables; and
a cells segmenter configured to reference the constructed datastructures to identify sub-sets of the set of vectors defining rectangles delineating cells of the table, each sub-set of vectors including at least (i) two vectors having common starting points and (ii) two vectors having common ending points;
wherein the apparatus is embodied by a digital processor.

16. The apparatus as set forth in claim 15, wherein the cells segmenter identifies sub-sets of the set of non-redundant vectors each defining a rectangle delineating a minimal cell of the table.

17. The apparatus as set forth in claim 15, wherein the datastructures builder is further configured to construct datastructures associating vectors of the set of vectors with other vectors of the set of vectors having starting points in common with the ending point of the vector being associated.

18. The apparatus as set forth in claim 15, further comprises:
a table analyzer configured to perform content analysis of content of the delineated cells of the table.

* * * * *